Nov. 13, 1962  R. W. GRISWOLD II  3,063,658
SUPERSONIC AIRFOIL WITH BOUNDARY LAYER CONTROL
Filed March 1, 1960

INVENTOR.
ROGER W. GRISWOLD II
BY Frank H. Borden
atty.

United States Patent Office 3,063,658
Patented Nov. 13, 1962

3,063,658
SUPERSONIC AIRFOIL WITH BOUNDARY LAYER CONTROL
Roger W. Griswold II, Old Lyme, Conn.
Filed Mar. 1, 1960, Ser. No. 12,012
6 Claims. (Cl. 244—42)

This invention relates to powered entry sections of supersonic airfoils, and constitutes a continuation-in-part of application 426,665, issued March 8, 1960, as Patent 2,927,748, filed April 30, 1954 and application 590,068, issued January 9, 1962 as Patent 3,016,213, filed June 7, 1956.

It is the principal object of the invention to provide improved leading edge entry sections for powered airfoils of the supersonic type, to control the boundary and local flows thereover.

Figure 1:
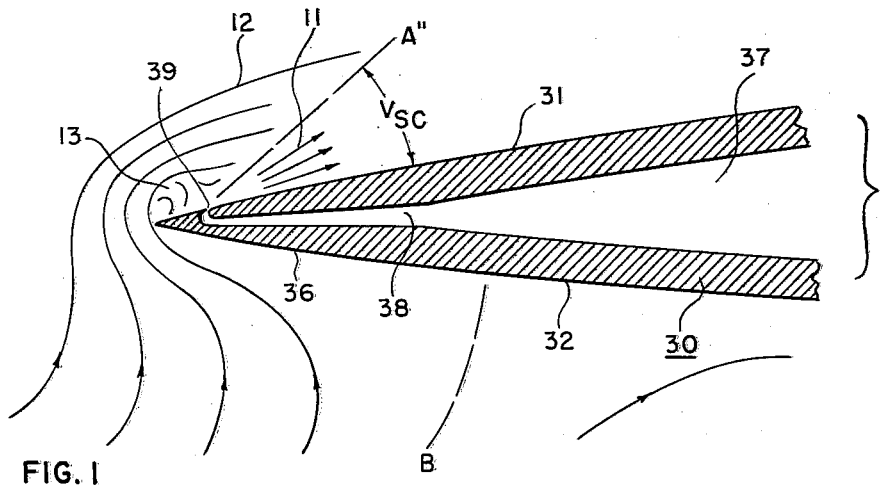

FIG. 1 is a section through the leading edge of an airfoil of the supersonic type according to the invention.

Figure 2:
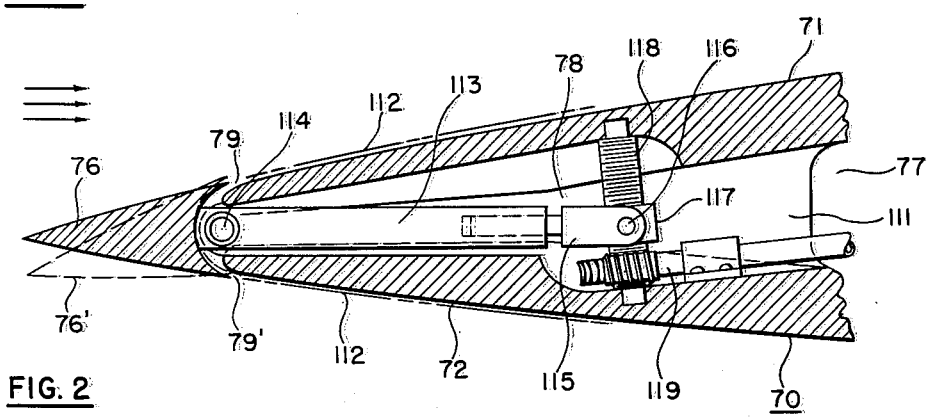

FIG. 2 is a cross sectional typical schematic segmental view of the leading edge section of a supersonic type airfoil incorporating a pivotally mounted entry wedge the external surfaces of which lie outside the basic airfoil profile, with internal operating gear to provide selectively dual rearwardly directed blowing jet nozzles, the efflux of which are above and below the airfoil, surfaces, or effectively a single nozzle, the efflux of which is rearwardly and upwardly directed over one surface.

Figure 3:
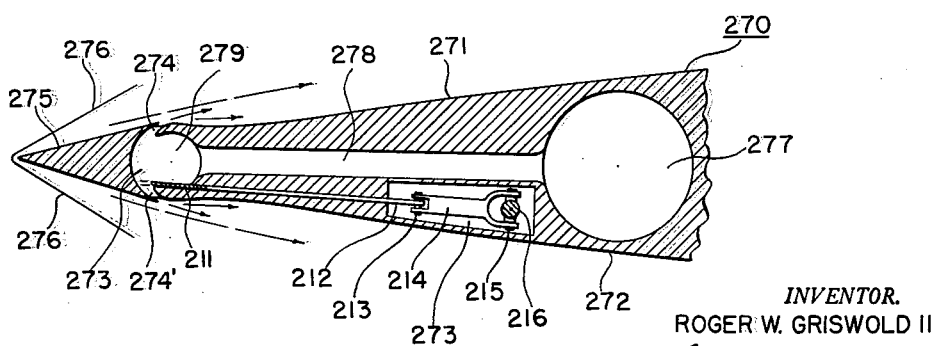

FIG. 3 is a chordwise leading edge cross section of a discontinuous type of supersonic airfoil incorporating a sharp entry wedge with supercritical velocity blowing jets interposed therebetween and the adjacent recessed main airfoil profile, such jets being arranged to discharge rearwardly over both surfaces of the airfoil or over only one surface, similar to FIG. 2, with the resultant entry Mach cone and local streamlines partially shown for the high speed condition of the supersonically-expanding blowing jets, which configuration is effective to provide boundary layer control over the main airfoil surfaces at compressible flow speeds in the dual jet adjustment operatively indicated by this figure, while with only the upper surface jet operative, in this case, the airfoil leading edge is effectively converted to a functionally-bulbous entry with jet-induced and augmented circulation thereover to provide high lift at low speeds for such type of supersonic airfoil.

FIG. 1 illustrates what is known as a supercritical velocity, blowing jet, i.e. the air supply therefor in pressure duct 37, is sufficiently compressed that upon upward and rearwardly-directed discharge from jet efflux 39, via communicating nozzle 38, the jet expands supersonically at 11, between the upper surface 31 of airfoil 30, and the confluence streamline A″, adjacent the local flow 12, which is partially absorbed by the powerful induction of the jet. The occurrence of minor and very much localized leading edge separation 13 comprises a bound vortical flow phenomenon of no practical significance so far as concerns the lift and drag of the airfoil in the low speed operative range herewith portrayed. Functionally, at low speeds, the airfoil is effectively provided with a well-rounded leading edge and a large equivalent increase in effective camber by the supercritical velocity jet, which factors are together productive of high lift coefficients.

Respecting the matter of compressible flow minimum drag, FIG. 2 discloses an alternative type of supersonic entry wherein the blowing jet would be continuously operable. In the high speed range, dual jets discharge tangentially and rearwardly over both surfaces of airfoil 70, from upper efflux 79 and lower efflux 79′, respectively formed by the juxtaposition of structurally-sharp entry wedge 76 forwardly of upper surface 71 and lower surface 82 which, in turn, through rigid interconnection to rib 111 by rivets or other suitable means, define nozzle passage 78 communicating with effluxes 79 and 79′ and pressure duct 77. It will be noted that this configuration comprises a discontinuous airfoil in that the spaced relation of surfaces 71 and 72 also defines a recessed outer profile for airfoil 70 which falls inside of the rearward profile extension of the outer surfaces of wedge 76 by substantially the width of efflux 79 and 79′, as indicated by phantom lines 112—112. The velocity of the blowing jets discharging from effluxes 79 and 79′ will be supercritical, i.e. supersonic, as will be adjusted with respect to the local flow velocities for particular cases to provide optimum alleviation of pressure discontinuities and control of shock wave separation and buffeting phenomena. So far as known to applicant, such a compressible flow control system comprises completely new aerodynamic art whereby the blowing jet which has so far generally been found to be inimical to the attainment of minimal drag for the subsonic case, is herein so applied at supersonic speeds as to complement the basic profiles of the aircraft surfaces by ejection of a thin fluid stream harmonized with the local flow and effectively providing a pneumatic lubricant therebetween. It will, of course, be perfectly obvious that the FIG. 2 configuration is also applicable to bodies of revolution, such as fuselages, engine nacelles, external fuel tanks, etc. It will further be clear that such applications of the blowing jet system can be readily combined with the more rearwardly disposed suction systems for normal shock wave separation control.

The means herein proposed will accordingly contribute fundamental compressible flow improvements, in comparison with the drag and stability characteristics of conventional sharp-entry supersonic aerodynamic bodies.

Referring again to FIG. 2, wedge 76 is rigidly attached to the arm assembly 113, which is pivotally mounted on rib 111 at pivot 114 and rearwardly thereof yoke 115 comprises a concentric slidable extension of arm 113, yoke 115 being pivotally mounted by pivots 116—116, only one shown, on opposite sides of screw collar 117 meshing with screw jack 118 rotatably carried by suitable bearing depressions milled into the inner faces of surfaces 71 and 72, as are any other cut-outs that may be required for the free travel of the foregoing described mechanism. Screw jack 118 is operated by worm drive irreversible gear assembly 119, which in turn is actuated by electrical, hydraulic, mechanical or other suitable means well known in the art. When collar 117 is moved to the upper limit of its travel, wedge 76 which is similar only insofar as selective dual or single jet operation is concerned to the entry wedges disclosed in applicant's applications 234,582, filed June 30, 1951, and 264,373, filed December 26, 1951, copending with application 426,-665, filed April 30, 1954, and now abandoned, is drooped to the dotted line position 76′, thus effectively closing lower efflux 79′ and thereby directing the full jet discharge from the enlarged efflux 79 only over upper surface 71, to provide circulation control about the airfoil in the low speed range. In the preferred installation, rib 111 would be used in coupled pairs bracketing arm assembly 113 and irreversible gear 119 immediately on either side thereof.

Thus the FIG. 2 as a modification of the FIG. 1 disclosure illustratively indicates common means to attain both the highly desirable powered airfoil functions at low subsonic speeds, together with new and improved sharp-entry supersonic airfoil functions, or like functions respecting other aerodynamic bodies, at compressible flow speeds.

Such devices as auxiliary blowers or the compressor bleed method are usually readily available irrespective of location in fixed wing aircraft, as the power source for the requisite blowing air supplies.

It will be understood that for applications of the invention wherein the blowing jet discharges below critical sonic velocities, that the relatively low pressure air supply thereof, in contrast to the high pressure compressed air supply for the supercritical velocity jet, may alternatively be obtained from various gas turbine compound power plants, such as ducted-fan, by-pass, or turbofan engines, or from any other suitable power source. Further, that such power sources may equally well serve to energize the suction fluid flow, alone, or together with that for the blowing jet for those cases wherein the fluid flow is common to both elements of the dual flow control system. Also that, subject to the installation and operational requirements of particular applications, the blowing jet and suction fluid flows may be completely independent of each other, or a common fluid flow may serve both the CC (Circulation Control) and BLC (Boundary Layer Control) functions, according to the flow control flexibility that is desired respecting continuous or intermittent operation of one or both fluid flows.

With blowing jet powered airfoils the jet must obviously be energized by some sort of blowing device. The pressurized flow therefrom may comprise simply the efflux from a jet engine, primary or auxiliary, compressor bleed or by means of a separate blower operated by any suitable powerplant. Selective control means are herein provided to either vary the momentum of the blowing jet directly, or indirectly in a relative manner inversely with change in the airfoil's translational speed for the case of constant blowing jet momentum, or combinations of such selective control means may be used. For example, it may be preferable in some fixed-wing installations to control the jet momentum itself which will concomitantly also be controlled relatively by changing the aircraft speed, whereas in helicopter applications it will obviously be more convenient to simply supply constant blowing input to the rotor blade system wherein translational flight itself will provide automatically the design differential in relative jet momentum and thus the respective jet velocity ratios between the advancing and retreating blades.

Use of the word "tangent" to identify the relation between the arcuate jet discharge, the surface downstream of the jet and internally adjacent thereto, and the externally adjacent circulatory local flow, as well as otherwise used herein, conforms with the following definition of "tangent" given by the Shorter Oxford Dictionary, as reprinted in 1950, to wit: "a straight line which touches a curve, or a curved surface, i.e. meets it at a point and being produced does not ordinarily intersect it at that point." In other words, at the point of effluence of the jet it contacts the respectively adjacent curved surface of the airfoil and the local circulatory flow in substantial instantaneous parallelism therewith and in the direction of the latter flow to which the jet imparts kinetic energy by viscous shear transfer action.

FIGURE 3 depicts leading edge section 270 of a supersonic air foil having a discontinuous profile especially shaped for particular sonic operating speeds, comprising sharp-entry wedge 275 rigidly carried by interconnecting rib 273—273 and spaced forwardly from main airfoil upper surface 271 and lower surface 272 respectively recessed below or inside of the imaginary continuation of the corresponding surfaces of wedge 275 to form respective upper and lower rearwardly-directed leading edge slots 274 and 274' communicating internally with local spanwise pressure duct 279 and main spanwise pressure duct 277 through interconnecting chordwise pressure duct 278. The optimum jet velocity ratios for particular operating speeds with both blowing jets operative in such type of flow control system, are variable according to the design aircraft speed, the airfoil local flow velocities, and the desired boundary layer control effects. For continuous operation at supersonic speeds, the jets issuing from slots 274—274' will preferably discharge supercritically, i.e. from the condition known as choked-nozzle blowing whereby the highly compressed flow of the order of two atmospheres or considerably more which is distributed through ducts 277, 278 and 279, expands supersonically after release from slots 274—274'. Such supersonic expansion of the blowing jets in the process of returning to ambient pressure, will accordingly effectively fill the space pneumatically between the recessed surfaces 271 and 272 and the region of substantial tangential confluence at compressible flow speeds with the adjacent local flow passing over wedge 275, such confluent flows likewise being so matched as to their respective velocities that the blowing jets will provide optimum boundary layer control effects at the design normal sonic operating speed of the aircraft. It obviously follows that the extent to which surfaces 271 and 272 are recessed depends upon the particular operating speed of the aircraft at which the desired supercritical blowing jet BLC effects are to be attained. The leading edge shock wave or Mach cone incident on wedge 275 at an assumed compressible flow operating speed, is indicated at 276—276.

Continuing with FIGURE 3, the series of local ducts 279, which each extend between spanwisely spaced ribs 273, contain in the lower portions thereof, the gate valve slide plate elements 211 controlled by chordwise push-pull rods 212, pivotally connected at 213 to drag links 214, which in turn are pivotally connected at 215 to spanwise main push-pull rod, 216, slidably guided in the respective ribs 273 and controlled by suitable manually actuated means. It will be understood that slots 274—274' will normally both be open at supersonic aircraft speeds, as described above. For take-off and landing operations, however, valve elements 211 will be slid forwardly to the indicated dotted line position whereat lower slot 274' is effectively closed. The supercritically expanding jet discharging only from upper slot 274 in the presence of the relatively low subsonic local flow velocity prevailing in the slow speed range of the aircraft, will accordingly expand supersonically through a much wider divergent angle with reference to upper surface 271, than obtains for the high speed condition previously described, which will effectively convert sharp entry wedge 275 into the functional equivalent of a bulbous leading edge, in spite of the inconsequential region of local flow separation immediately adjacent the upper surface of wedge 275, with consequent substantial jet-induced circulation over the airfoil, thus providing acceptable slow speed performance for such type supersonic aircraft. The foregoing high-lift flow phenomena with supercritical velocity blowing over the upper surface of such type sharp-entry supersonic airfoil, are schematically illustrated by FIGURE 1. FIGURE 2 likewise illustrates means whereby the sharp-entry wedge may be pivotally mounted on the main airfoil section to control the respective slots for the same functional effects. Such pivotal means could alternatively be used herein.

For certain supersonic types of aircraft, the FIG. 3 type of sharp-entry flow control configuration, could be combined with either the FIGS. 1 or 2 types of blunt-tailed circulatory jet airfoil systems disclosed in said application 590,068. The FIG. 3 type of supersonic entry section could, of course, be used in combination with any type of trailing edge section, in view of the flow control merits of such a system in its own right. Further, while it may not be so obvious, it is within the scope of this invention to apply the FIG. 3 type of blowing jet entry wedge configuration, in duplicate, to comprise the composite upper and lower split entry nose sections for a supersonic type of ducted airfoil leading edge configuration.

I claim as my invention:

1. A supersonic airfoil comprising front and rear wing portions having chordwise extent and formed respectively by upper and lower surfaces, said portions having predetermined effective spacing defining efflux slots directing when operatively energized relatively high velocity blowing jets downstreamwardly across said rear portion surfaces, said rear portion defining a duct passage communicating with said slots for transporting pressurized fluid flow thereto, the surfaces of said front portion being downstreamwardly divergent and the surfaces of said rear portion being downstreamwardly convergent for a part of their chordwise extent and downstream thereof being downstreamwardly divergent for another part of their chordwise extent.

2. A supersonic airfoil as in claim 1, in which the said convergent and divergent surfaces of said rear portion form surface concavities therein.

3. A supersonic airfoil as in claim 1, and means movable to shut off one of said efflux slots.

4. A supersonic airfoil as in claim 1, in which the divergence of the surfaces of said front portion is from a sharp edge.

5. A supersonic airfoil as in claim 1, in which parts of the surfaces of said rear portion are mutually reentrant.

6. A supersonic body comprising front and rear portions respectively defined by surfaces having chordwise extent, said portions having predetermined effective spacing defining an efflux slot directing when operatively energized a relatively high velocity blowing jet downstreamwardly across said rear portion, said rear portion defining a duct passage communicating with said slot for transporting pressurized fluid flow thereto, said front portion surfaces being downstreamwardly divergent and said rear portion surfaces being downstreamwardly convergent for a part of their chordwise extent and downstream thereof being downstreamwardly divergent for another part of their chordwise extent.

References Cited in the file of this patent

UNITED STATES PATENTS

| | | |
|---|---|---|
| 1,887,148 | De Ganahl | Nov. 8, 1932 |
| 2,868,480 | Attinello | Jan. 13, 1959 |

FOREIGN PATENTS

| | | |
|---|---|---|
| 955,762 | France | July 4, 1949 |

OTHER REFERENCES

N.A.C.A. Tech. Note, No. 1211, March 1947, Figure 1.